(12) United States Patent
Kang (10) Patent No.: US 8,849,327 B2
(45) Date of Patent: Sep. 30, 2014

(54) APPARATUS AND METHOD FOR CONTROLLING POWER TO MITIGATE INTERFERENCE IN WIRELESS COMMUNICATION SYSTEM

(71) Applicant: Samsung Electronics Co. Ltd., Suwon-si (KR)

(72) Inventor: Nam-Koo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 13/762,856

(22) Filed: Feb. 8, 2013

(65) Prior Publication Data

US 2013/0203453 A1    Aug. 8, 2013

(30) Foreign Application Priority Data

Feb. 8, 2012   (KR) ........................ 10-2012-0012858

(51) Int. Cl.
*H04W 52/24* (2009.01)
*H04W 52/14* (2009.01)
*H04W 52/34* (2009.01)

(52) U.S. Cl.
CPC .......... *H04W 52/244* (2013.01); *H04W 52/243* (2013.01); *H04W 52/143* (2013.01); *H04W 52/343* (2013.01); *H04W 52/146* (2013.01)
USPC ........ 455/501; 455/114.2; 455/522; 455/134; 455/135; 370/280; 370/335; 370/332; 370/331; 342/378

(58) Field of Classification Search
CPC ............ H04W 52/143; H04W 52/146; H04W 52/243; H04W 52/244; H04W 52/343; H04W 52/02; H04W 52/04; H04W 52/14; H04W 52/24; H04W 52/245; H04W 52/246

USPC ............. 455/501, 522, 422.1, 450, 500, 423, 455/466, 561, 9, 13.4, 513, 67.11, 67.13, 455/67.16, 115.1, 115.3, 135, 134, 114.2; 370/338, 249, 329, 252, 328, 335, 331, 370/280; 342/378

See application file for complete search history.

(56) References Cited

U.S. PATENT DOCUMENTS

| 2003/0016174 A1* | 1/2003 | Anderson ...................... 342/378 |
| 2004/0151141 A1* | 8/2004 | Proctor et al. ................ 370/335 |
| 2007/0042784 A1* | 2/2007 | Anderson ...................... 455/450 |
| 2008/0146154 A1* | 6/2008 | Claussen et al. ............. 455/63.1 |

(Continued)

FOREIGN PATENT DOCUMENTS

KR    10-2012-0087423 A    8/2012

*Primary Examiner* — Tan Trinh
(74) *Attorney, Agent, or Firm* — Jefferson IP Law, LLP (57) ABSTRACT

An apparatus and a method for controlling power in a wireless communication system are provided. The method includes receiving interference information comprising a resource usage rate, from at least one neighboring BS, calculating a throughput variance amount, which is expected if the serving BS changes power, experienced by the at least one neighboring BS, by using the interference information, calculating a throughput variance amount, which is expected if the serving BS changes power, of at least one Mobile Station (MS) having access to the serving BS, and controlling power for the at least one MS by using the throughput variance amount experienced by the at least one neighboring BS and the throughput variance amount of the at least one MS. The interference information represents a throughput variance amount generated in the at least one neighboring BS when the serving BS changes the power.

20 Claims, 3 Drawing Sheets

(56) References Cited

U.S. PATENT DOCUMENTS

| | | | |
|---|---|---|---|
| 2010/0113006 A1* | 5/2010 | Pajjuri et al. | 455/423 |
| 2011/0170467 A1* | 7/2011 | Proctor et al. | 370/311 |
| 2011/0188458 A1* | 8/2011 | Sebeni et al. | 370/329 |
| 2011/0211560 A1* | 9/2011 | Yamamoto et al. | 370/332 |
| 2011/0228712 A1* | 9/2011 | Anderson | 370/280 |
| 2012/0142392 A1* | 6/2012 | Patel et al. | 455/522 |
| 2012/0238302 A1* | 9/2012 | Pedersen et al. | 455/501 |
| 2014/0003342 A1* | 1/2014 | Sheriff et al. | 370/328 |
| 2014/0029464 A1* | 1/2014 | Sebeni et al. | 370/252 |

* cited by examiner

APPARATUS AND METHOD FOR CONTROLLING POWER TO MITIGATE INTERFERENCE IN WIRELESS COMMUNICATION SYSTEM

PRIORITY

This application claims the benefit under 35 U.S.C. §119 (a) of a Korean patent application filed on Feb. 8, 2012 in the Korean Intellectual Property Office and assigned Serial No. 10-2012-0012858, the entire disclosure of which is hereby incorporated by reference.

BACKGROUND OF THE INVENTION

1. Field of the Invention

The present invention relates to a wireless communication system.

2. Description of the Related Art

In a 4th Generation (4G) communication system that is the next generation communication system, intensive research is being conducted to provide users with high-speed services having various Qualities of Service (QoS). 4 G communication systems include an Institute of Electrical and Electronics Engineers (IEEE) 802.16e system, a 3rd Generation Partnership Project (3GPP)/3GPP2 Long Term Evolution (LTE) system, and the like. In particular, research on the 4 G communication system is being actively made to support high-speed services in the way of guaranteeing mobility and QoS for a broadband wireless access communication system such as a Wireless Local Area Network (WLAN) system and a Wireless Metropolitan Area Network (WMAN) system.

As one means for providing a broadband service, a study on increasing spectral efficiency is being carried out. In general, spectral efficiency is maximized when a frequency reuse rate is equal to '1'. However, when the frequency reuse rate is equal to '1', significant interference is caused between cells, because the same frequency channel is reused in all Base Stations (BSs). In this case, although each BS increases transmission power, capacity does not increase, because inter-cell interference similarly increases. To increase the spectral efficiency in this environment, it is important to effectively control the inter-cell interference.

In order to effectively control the inter-cell interference using frequency resource distribution between neighboring BSs, a Fractional Frequency Reuse (FFR) technique has been proposed. According to the FFR technique, a part of a frequency resource is redundantly used in all sectors, and is mostly allocated to users who are located in a cell center area not subject to a large amount of inter-cell interference. The remaining portions of the frequency resource is a region divided and used without redundancy between neighboring sectors, and is mostly allocated to users who are located in a cell boundary area having significant inter-cell interference. The disadvantages associated with the FFR technique are that an available frequency resource is reduced due to non-use of part of the whole frequency resource, and that an average sector capacity is decreased.

Upon installation, the FFR technique must determine a frequency allocation pattern between neighboring sectors. For example, upon network installation, the FFR technique should determine a frequency pattern for FFR and a frequency limitation resource and limitation power level suitably to a cell environment. After the network installation, if the cell environment is changed, the FFR technique requires the cumbersome work associated with manually changing the FFR frequency pattern through re-execution of cell planning.

In addition, even if the cell environment is not changed, if users are instantaneously concentrated in the cell boundary area or cell center area, the FFR technique requires that the FFR frequency pattern be instantaneously changed to take the configuration or concentration of the users into account. For example, if the users are concentrated in the cell center area, it is desirable to use, without division, all resources and power, because all users within a cell experience less interference. For another example, if all users are located in the cell boundary area, it is desirable to divide and use all regions between neighboring sectors, because all the users within the cell experience significant interference influence. However, the FFR technique is impossible to change the frequency pattern or control the power adaptively to the instantaneous distribution of the users, because using a previously planned and set frequency pattern.

As described above, a disadvantage associated with the FFR technique is that the FFR technique fails to reflect an instantaneous communication environment. Accordingly, there is a need to propose an alternative for controlling interference more effectively according to an instantaneous resource use status.

Therefore, a need exists for an apparatus, system and method for mitigating inter-cell interference in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for mitigating inter-cell interference in a wireless communication system.

Another aspect of the present invention is to provide an apparatus and method for controlling power according to a communication environment in a wireless communication system.

Another further aspect of the present invention is to provide an apparatus and method for controlling power according to a resource use status in a wireless communication system.

Yet another aspect of the present invention is to provide an apparatus and method for exchanging interference information having reflected a resource usage rate in a wireless communication system.

The above aspects are achieved by providing an apparatus and method for controlling power to mitigate interference in a wireless communication system.

In accordance with an aspect of the present invention, an operation method of a serving Base Station (BS) in a wireless communication system is provided. The method includes receiving interference information comprising a resource usage rate, from at least one neighboring BS, calculating a throughput variance amount, which is expected if the serving BS changes power, experienced by the at least one neighboring BS, by using the interference information, calculating a throughput variance amount, which is expected if the serving BS changes power, of at least one Mobile Station (MS) having access to the serving BS, and controlling power for the at least one MS by using the throughput variance amount experienced by the at least one neighboring BS and the throughput variance amount of the at least one MS. The interference information represents a throughput variance amount generated in the at least one neighboring BS when the serving BS changes the power.

In accordance with another aspect of the present invention, an apparatus of a serving BS in a wireless communication system is provided. The apparatus includes a backhaul communication unit for receiving interference information comprising a resource usage rate, from at least one neighboring BS, and a controller for, calculating a throughput variance amount, which is expected if the serving BS changes power, experienced by the at least one neighboring BS, by using the interference information, for calculating a throughput variance amount, which is expected if the serving BS changes power, of an at least one MS having access to the serving BS, and for controlling power for the at least one MS by using the throughput variance amount experienced by the at least one neighboring BS and the throughput variance amount of the at least one MS. The interference information represents a throughput variance amount generated in the at least one neighboring BS when the serving BS changes the power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to an apparatus and a method for mitigating inter-cell interference in a wireless communication system. Below, exemplary embodiments of the present invention describe a technology for mitigating inter-cell interference in a wireless communication system. Particularly, exemplary embodiment the present invention describes a technology for efficiently controlling interference in terms of the whole system by exchanging an actual resource usage rate of each Base Station (BS) between BSs along with information about the extent of interference having influence on each Mobile Station (MS).

An interference control technology of changing a power pattern adaptively to a cell environment or real-time user distribution may be realized by using inter-cell cooperative scheduling through information sharing for MS distribution between neighboring BSs and an interference amount experienced by the MS. Exemplary embodiments of the present invention enable Inter-Cell Interference Coordination (ICIC) through inter-cell information exchange, and avoid unnecessary downlink power control by considering a resource usage rate of each BS together.

According to an exemplary embodiment of the present invention, a serving BS determines interference information associated with interference caused by a neighboring BS, by using a signal reception state for the serving BS and at least one neighboring BS reported from an MS. The serving BS reflects a downlink resource usage rate of the serving BS in the determined interference information and thereafter, the serving BS forwards the interference information, which has reflected the resource usage rate of the serving BS, to the at least one neighboring BS. The serving BS receives interference information, which is generated in the same way, from the at least one neighboring BS and thereafter, the serving BS determines downlink power by a serving MS by using the received interference information.

In detail, for the sake of interference control, a serving BS receives a Received Signal Strength Indication (RSSI) for the serving BS and at least one neighboring BS from each MS and, by using the RSSI, the serving BS estimates the extent of interference from a neighboring BS. The serving BS determines a gain and loss resulting from a change of an interference amount exerted to each MS by using estimated interference information, grants the grain and loss a weight dependent on its downlink resource usage rate, and exchanges interference information having reflected the resource usage rate with the neighboring BS. Thereafter, the serving BS determines transmission power by MS in the way of maximizing a system gain.

The aforementioned procedure may be carried out according to a constant period. For example, the aforementioned procedure may be carried out every frame or at an interval of a predefined number of frames.

An interference control process proposed according to exemplary embodiments of the present invention is described below in detail.

First, a serving BS receives RSSI information from an MS. The RSSI information includes a received signal strength indication for the serving BS and a received signal strength indication for at least one neighboring BS. On the assumption that a neighboring BS increases downlink power by using the RSSI information, the serving BS determines a Modulation order Product code Rate (MPR). The MPR represents a rate of an actual information bit compared to a physically transmissible bit. For example, the MPR may be calculated as in Equation 1 below.

$$CQI_{CELL}[i] = \frac{RSSI_{SBS}[i][k]}{\sum_{m \neq k} RSSI_{NBS}[i][m] + N_0} \quad (1)$$

$$CQI_{CELL,var,NBS}[i][m] =$$

$$\frac{RSSI_{SBS}[i][k]}{RSSI_{NBS}[i][m] + \sum_{m\ index \neq k} RSSI_{NBS}[i][m\ index] + N_0}$$

$$CQI_{CELL,var,SBS}[i][m] = \frac{2 \times RSSI_{SBS}[i][k]}{\sum_{m \neq k} RSSI_{NBS}[i][m] + N_0}$$

$$MPR[i] = f(CQI_{CELL}[i])$$

$$MPR_{NBS}[i] = f(CQI_{CELL,var,NBS}[i][m])$$

$$MPR_{SBS}[i] = f(CQI_{CELL,var,SBS}[i][m])$$

In Equation 1 above, the 'k' denotes an index of a serving BS, the 'm' denotes an index of a neighboring BS, the 'i' denotes an index of an MS, the '$CQI_{CELL}[i]$' denotes a channel state (i.e., Channel Quality Information (CQI)) for the MS (i), the '$RSSI_{SBS}[i][k]$' denotes a received signal strength indication for the serving BS (k) measured by the MS (i), the '$RSSI_{NBS}[i][m]$' denotes a received signal strength indication for the neighboring BS (m) measured by the MS (i), the '$N_0$' is power of Gaussian noise determined according to a system bandwidth, and generally has a power density of −174 dBm/Hz, the '$CQI_{CELL,var,NBS}[i][M]$' denotes a channel quality for the MS (i) of when the neighboring BS (m) increases downlink power, the '$CQI_{CELL,var,SBS}[i][k]$' denotes a channel quality for the MS (i) of when the serving BS (k) increases downlink power, the '$MPR[i]$' denotes an MPR for the current MS (i), the '$MPR_{NBS}[i]$' denotes an MPR for the MS (i) of when the neighboring BS (m) increases the downlink power, the '$MPR_{SBS}[i]$' denotes an MPR for the MS (i) of when the serving BS (k) increases the downlink power, and the 'f( )' denotes a function of calculating an MPR.

The function (f( )) of calculating the MPR value may be different according to an exemplary embodiment of the present invention. For example, the function (f( )) may be configured in the way of using Shannon capacity or using a table corresponding to a fixed Modulation and Coding Scheme (MCS) level, according to a service purpose, a service environment, and the like.

After receiving the RSSI information to determine the MPR, the serving BS determines a throughput sensitivity for the neighboring BS (m) by using the MPR determined through the aforementioned process. The throughput sensitivity may be referred to as 'throughput variance amount' in that the throughput sensitivity represents the extent of variance of the MPR. Also, the throughput sensitivity may be referred to 'interference information' in that the throughput sensitivity represents interference information. The throughput sensitivity may be calculated as an average value for MSs. For example, the throughput sensitivity may be calculated as in Equation 2 below.

$$S_{NBS,var,Tput}[k][m] = \sum_i \frac{MPR[i]/MPR_{NBS}[i]^a}{Num_{MS}} \quad (2)$$

In Equation 2 above, the '$S_{NBS,var,Tput}[k][m]$' denotes a throughput sensitivity for the neighboring BS (m) calculated by the serving BS (k), the 'MPR[i]' denotes an MPR for the current MS (i), the '$MPR_{NBS}[i]$' denotes an MPR for the MS (i) of when the neighboring BS (m) increases downlink power, the 'a' denotes a weight factor, and the '$Num_{MS}$' denotes the number of MSs having access to the serving BS (k). A detailed value of the weight factor (a) may be defined according to a service purpose and an intention of an entity according to exemplary embodiments of the present invention.

The throughput sensitivity given in Equation 2 above corresponds to a throughput loss amount generated in the serving BS (k) when the neighboring BS (m) increases downlink power. In other words, the throughput sensitivity corresponds to a variance amount of an MPR generated in the serving BS (k) when the neighboring BS (m) increases the downlink power.

After determining the throughput sensitivity for the neighboring BS (m), the serving BS continuously updates a downlink resource usage rate of its own cell according to an update period. The update period can be differently defined according to an exemplary embodiment of the present invention. For instance, the update period can be a frame or a plurality of frames. For instance, the resource usage rate can be calculated as in Equation 3 below.

$$SLOT_{Avail,total} = \sum SLOT_{Avail,frame} \quad (3)$$

$$SLOT_{Used,total} = \sum SLOT_{Used,frame}$$

$$LF = \frac{SLOT_{Used,total}}{SLOT_{Avail,total}^b}$$

In Equation 3 above, the '$SLOT_{Avail,total}$' denotes a resource amount available in frames belonging to an update period, the '$SLOT_{Avail,frame}$' denotes a resource amount available in one frame, the '$SLOT_{Used,total}$' denotes a resource amount used in the frames associated with the update period, the '$SLOT_{Used,frame}$' represents a resource amount used in one frame, the 'LF' denotes a resource usage rate, and the 'b' denotes a weight factor for the available resource amount. A detailed value of the weight factor (b) may be defined according to a service purpose and an intention of an entity according to exemplary embodiments of the present invention. The available resource amount can either represent purely only a resource amount of a data region, or include a resource amount of a control region such as a preamble, a MAP as well as the resource amount of the data region.

After calculating the resource usage rate of the serving BS, the serving BS determines throughput sensitivity information, which will be provided to at least one neighboring BS. The throughput sensitivity information is determined reflecting the resource usage rate. For instance, the throughput sensitivity information can be determined as in Equation 4 below.

$$SLF_{NBS,var,Tput}[k][m] = LF \times S_{NBS,var,Tput}[k][m] \quad (4)$$

In Equation 4 above, the $SLF_{NBS,var,Tput}[k][m]$ denotes a throughput sensitivity having reflected a resource usage rate (LF), which will be provided to the neighboring BS (m) from the serving BS (k), the 'LF' denotes the resource usage rate, and the '$S_{NBS,var,Tput}[k][m]$' denotes a throughput sensitivity, which does not have reflected the resource usage rate (LF) for the neighboring BS (m) calculated by the serving BS (k).

According to another exemplary embodiment of the present invention, the throughput sensitivity can be calculated as in Equation 5 below.

$$SLF_{NBS,var,Tput}[k][m] = LF \times \sum_{i} \log \frac{MPR[i]/MPR_{NBS}[i]^a}{Num_{MS}} \quad (5)$$

In Equation 5 above, the '$SLF_{NBS,var,Tput}[k][m]$' denotes a throughput sensitivity having reflected a resource usage rate (LF), which will be provided to the neighboring BS (m) from the serving BS (k), the 'LF' denotes the resource usage rate, the 'MPR[i]' denotes an MPR for the current MS (i), the '$MPR_{NBS}[i]$' denotes an MPR for the MS (i) of when the neighboring BS (m) increases downlink power, the 'a' denotes a weight factor, and the '$Num_{MS}$' denotes the number of MSs having access to the serving BS (k). A detailed value of the weight factor (a) can be defined according to a service purpose and an intention of an entity according to exemplary embodiments of the present invention. In addition to the another exemplary embodiment given in Equation 5 above, the throughput sensitivity can be deformed variously in the way of maximizing a transfer rate, the way of maximizing a Proportional Fair (PF) metric, and the like.

After determining the throughput sensitivity having reflected the resource usage rate for each neighboring BS, the serving BS forwards the throughput sensitivity having reflected the resource usage rate, to at least one neighboring BS, and receives a throughput sensitivity for the serving BS determined in each neighboring BS. At this time, the throughput sensitivity is forwarded through an upper node or through a direct link.

Next, the serving BS calculates the sum of throughput sensitivities for itself, which are received from at least one or more neighboring BSs. For example, the sum of throughput sensitivities can be calculated as in Equation 6 below.

$$SLF_{Sum,var,Tput} = \sum_{m \neq k} SLF_{NBS,var,Tput}[m][k] \quad (6)$$

In Equation 6 above, the '$SLF_{Sum,var,Tput}$' denotes the sum of throughput sensitivities, which have reflected a resource usage rate (LF), provided to the serving BS (k) from at least one or more neighboring BSs, and the '$SLF_{NBS,var,Tput}[k][m]$' denotes a throughput sensitivity, which has reflected the resource usage rate (LF), provided to the serving BS (k) from the neighboring BS (m).

After calculating the sum of throughput sensitivities, the serving BS calculates a throughput gain amount by MS of when the serving BS increases downlink power. For example, the throughput gain amount by MS of when the serving BS increases the downlink power can be calculated as in Equation 7 below.

$$S_{SBS,var,Tput}[i] = \frac{MPR_{SBS}[i]^c}{MPR[i]} \quad (7)$$

In Equation 7 above, the '$S_{SBS,var,Tput}[i]$' denotes a throughput gain amount of the MS (i) of when the serving BS (k) increases downlink power, the '$MPR_{SBS}[i]$' denotes an MPR for the MS (i) of when the serving BS (k) increases the downlink power, the 'c' denotes a weight factor, and the 'MPR [i]' denotes an MPR for the current MS (i). A detailed value of the weight factor (c) can be defined according to a service purpose and an intention of an entity according to exemplary embodiments of the present invention.

According to an exemplary embodiment of the present invention, the throughput gain amount by MS of when the serving BS increases the downlink power can be calculated as in Equation 8 below.

$$S_{SBS,var,Tput}[i] = \log \frac{MPR_{SBS}[i]^c}{MPR[i]} \quad (8)$$

In Equation 8 above, the '$S_{SBS,var,Tput}[i]$' denotes a throughput gain amount of the MS (i) of when the serving BS (k) increases downlink power, the '$MPR_{SBS}[i]$' denotes an MPR for the MS (i) of when the serving BS (k) increases the downlink power, the 'c' denotes a weight factor, and the 'MPR[i]' denotes an MPR for the current MS (i). A detailed value of the weight factor (c) can be defined according to a service purpose and an intention of an entity which practices the invention. In addition to the exemplary embodiment of the present invention given in Equation 8 above, the throughput sensitivity can be deformed variously in the way of maximizing a transfer rate, the way of maximizing a PF metric, and the like.

Next, the serving BS compares the throughput gain amount by MS with the sum of throughput sensitivities for the serving BS of the at least one or more neighboring BSs regarding each serving MS and, according to the comparison result, the serving BS determines boosting or deboosting of power for each MS. For example, if a throughput gain amount of a specific MS is greater than the sum of throughput sensitivities, the serving BS boosts power for the specific MS. In contrast, if the throughput gain amount of the specific MS is less than the sum of throughput sensitivities, the serving BS deboosts the power for the specific MS. In addition to this, a condition of maintaining the power can be further added. The conditions of the boosting and the deboosting can be expressed as in Equation 9 below.

$$S_{SBS,var,Tput}[i] > SLF_{Sum,var,Tput} \rightarrow \text{boosting}$$

$$S_{SBS,var,Tput}[i] < SLF_{Sum,var,Tput} \rightarrow \text{deboosting} \quad (9)$$

In Equation 9 above, the '$S_{SBS,var,Tput}[i]$' denotes a throughput gain amount of the MS (i) of when the serving BS (k) increases downlink power, and the '$SLF_{Sum,var,Tput}$' denotes the sum of throughput sensitivities, which have reflected a resource usage rate, provided to the serving BS (k) from at least one or more neighboring BSs. Further to the two conditions given in Equation 9 above, a condition of maintaining power can be further added.

In the aforementioned exemplary embodiment of the present invention, on the assumption that a serving BS increases downlink power, the serving BS determines a throughput gain amount of its own cell and a throughput sensitivity of at least one neighboring BS, and controls power according to the determined throughput gain amount and throughput sensitivity.

In contrast, according to an exemplary embodiment of the present invention, on the assumption that the serving BS decreases downlink power, a serving BS can determine a throughput sensitivity. In this case, the serving BS determines a throughput loss amount by MS regarding a serving MS, and throughput sensitivities of at least one or more neighboring BSs represent throughput gain amounts. According to such an exemplary embodiment of the present invention, if a throughput loss amount of a specific MS is less than the sum of throughput sensitivities of the at least one or more neighboring BSs, the serving BS deboosts power for the specific MS. In contrast, if the throughput loss amount of the specific MS is greater than the sum of throughput sensitivities of the at least one or more neighboring BSs, the serving BS boosts the power for the specific MS. In addition to this, a condition of maintaining the power can be further added.

Accordingly, the throughput loss amount and the throughput gain amount may be commonly referred to as a 'throughput variance amount'. Assuming an increase of downlink power, a throughput variance amount for an MS becomes a throughput gain amount, and a throughput sensitivity for the neighboring BS becomes a throughput loss amount of the neighboring BS. In this case, if the throughput gain amount is greater than the throughput sensitivity, then a gain at power increase is greater than a loss and therefore, a serving BS boosts power for the corresponding MS identically with the assumption. In contrast, assuming a decrease of downlink power, the throughput variance amount for the MS becomes a throughput loss amount, and the throughput sensitivity for the neighboring BS becomes a throughput gain amount of the neighboring BS. In this case, if the throughput loss amount is greater than the throughput sensitivity, then a loss at power decrease is greater than a gain and therefore, the serving BS boosts the power for the corresponding MS contrary to the assumption. For example, irrespective of whether the throughput variance amount for the MS is a throughput loss or a throughput gain, the serving BS boosts power of a specific MS if a throughput variance amount of the specific MS is greater than the throughput sensitivity for the neighboring BSs, and the serving BS deboosts the power of the specific MS if the throughput variance amount of the specific MS is less than the throughput sensitivity for the neighboring BSs. However, a condition of maintaining the power may be further added.

An operation and construction of a serving BS controlling power as described above are described below in detail with reference to the drawings.

Figure 1:
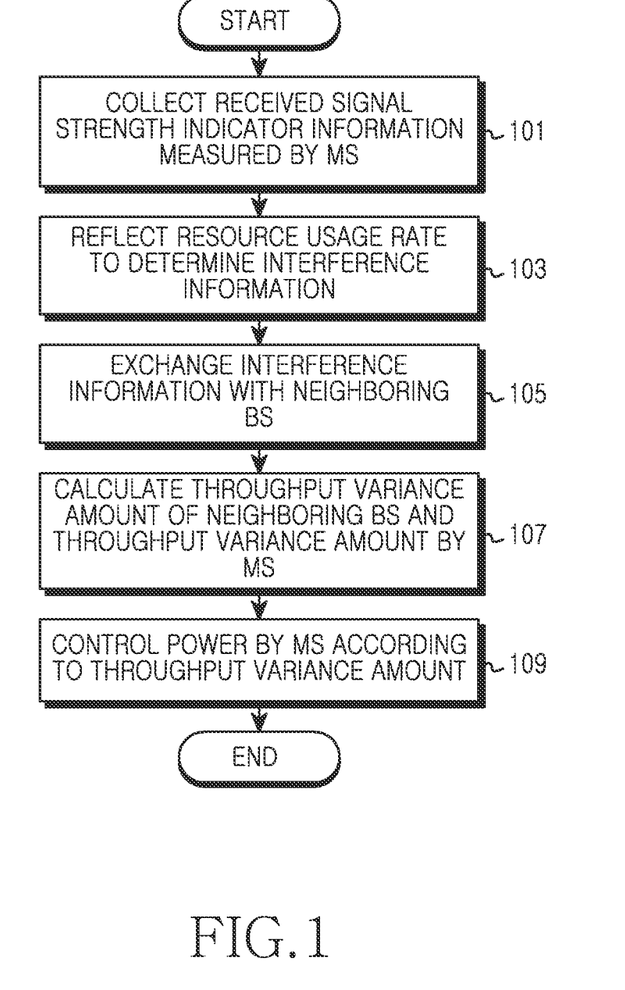
FIG. 1 is a flowchart illustrating an operation procedure of a serving Base Station (BS) in a wireless communication system according to an exemplary embodiment of the present invention.

FIG. 1 is a flowchart illustrating an operation procedure of a serving BS in a wireless communication system according to an exemplary embodiment of the present invention.

Referring to FIG. 1, in step 101, the serving BS collects received signal strength indication information measured by an MS, from the MS. The received signal strength indication information, which is a received signal strength indication for the serving BS measured by the MS, includes a received signal strength indication for at least one neighboring BS as well as the received signal strength indication for the serving BS. The MS may measure the received signal strength indication by using a preamble, a pilot, a reference signal, a synchronous channel signal, and the like. The received signal strength indication information may be received through a feedback channel allocated by the serving BS. According to an exemplary embodiment of the present invention, the serving BS may receive channel quality information, not the received signal strength indication information, from the MS.

After collecting the received signal strength information, the serving BS proceeds to step 103 in which the serving BS determines interference information having reflected a resource usage rate of the serving BS. The interference information, information to be provided to a neighboring BS, is determined using a received signal strength indication experienced by an MS, a channel quality experienced by the MS, a resource usage rate within a cell, and the like. For example, the serving BS calculates a channel quality of at least one MS by using the received signal strength indication information, and determines at least one MPR from the at least one channel quality. At this time, the serving BS determines an MPR of when each neighboring BS changes downlink power and an MPR of when itself changes downlink power. For example, the channel quality and the MPR may be determined as in Equation 1 above. According to an exemplary embodiment of the present invention, if the serving BS receives the channel quality information from the MS in step 101, the process of calculating the channel quality may be omitted. The serving BS calculates a throughput sensitivity of when each neighboring BS changes the downlink power, by using the determined at least one MPR, and reflects the resource usage rate in the throughput sensitivity to compensate the throughput sensitivity. For example, the throughput sensitivity may be determined as in Equation 2 above, the resource usage rate may be determined as in Equation 3 above, and the throughput sensitivity (i.e., the interference information having reflected the resource usage rate) may be determined as in Equation 4 above or Equation 5 above.

After determining the interference information, the serving BS proceeds to step 105 in which the serving BS exchanges the interference information with a neighboring BS. For example, the serving BS transmits interference information, which is determined for each neighboring BS in step 103, to the each neighboring BS. The serving BS receives interference information determined for the serving BS, from the each neighboring BS. The interference information received from at least one or more neighboring BSs represents a throughput variance amount that is generated in a corresponding neighboring BS because the serving BS changes downlink power. In detail, the throughput variance amount includes at least one of a throughput loss amount, which is generated in the corresponding neighboring BS because the serving BS increases the downlink power, and a throughput gain amount, which is generated in the corresponding neighboring BS because the serving BS decreases the downlink power. The interference information is forwarded through an upper node or through a direct link. Step 103 and step 105 may be carried out by periods according to a constant time interval.

After exchanging the interference information with the neighboring BS, the serving BS proceeds to step 107 in which the serving BS calculates a throughput variance amount exerted to the neighboring BS when the serving BS changes the downlink power, and a throughput variance amount by MS for at least one MS within a cell. If the change of the downlink power is an increase, the throughput variance amount exerted to the neighboring BS represents a throughput loss amount, and the throughput variance amount by MS for the at least one MS within the cell represents a throughput gain amount. In contrast, if the change of the downlink power is a decrease, the throughput variance amount exerted to the neighboring BS represents a throughput gain amount, and the throughput variance amount by MS for the at least one MS within the cell represents a throughput loss amount. The throughput variance amount exerted to the neighboring BS may be determined as the sum of throughput variance amounts included in the interference information received from the at least one neighboring BS. For example, the throughput variance amount exerted to the neighboring BS may be determined as in Equation 6 above. The throughput variance amount by MS may be determined in various ways such as the way of maximizing a transfer rate, the way of maximizing a PF metric and the like. For example, the serving BS may calculate the throughput variance amount by MS, by dividing by a current MPR an MPR of when the serving BS changes downlink power. At this time, a weight may be granted to the MPR of when the serving BS increases the downlink power. For example, the throughput variance amount by MS may be determined as in Equation 7 above or Equation 8 above.

After calculating the throughput variance amount exerted to the neighboring BS and the throughput variance amount by MS, the serving BS proceeds to step 109 in which the serving BS controls power for each MS according to the corresponding throughput variance amounts. For example, regarding each MS, the serving BS compares the throughput variance amount by MS with the throughput variance amount exerted to the neighboring BS. If the comparison result is that a throughput variance amount of a specific MS is greater than the throughput variance amount exerted to the neighboring BS, the serving BS increases downlink power for the specific MS. In contrast, if the throughput variance amount exerted to the neighboring BS is greater than the throughput variance amount of the specific MS, the serving BS decreases the downlink power for the specific MS. According to an exemplary embodiment of the present invention, if the throughput variance amount exerted to the neighboring BS is greater than the throughput variance amount of the specific MS, the serving BS may maintain the downlink power for the specific MS. According to a further exemplary embodiment of the present invention, if the throughput variance amount of the specific MS and the throughput variance amount exerted to the neighboring BS are the same as each other, the serving BS may maintain the downlink power for the specific MS. According to a yet another exemplary embodiment of the present invention, if a difference between the throughput variance amount of the specific MS and the throughput variance amount exerted to the neighboring BS is equal to or less than a threshold, the serving BS may maintain the downlink power for the specific MS.

After that, although not illustrated in FIG. 1, the serving BS allocates a burst to each MS according to the power control result determined in step 109, and transmits a signal at the determined power.

Figure 2:
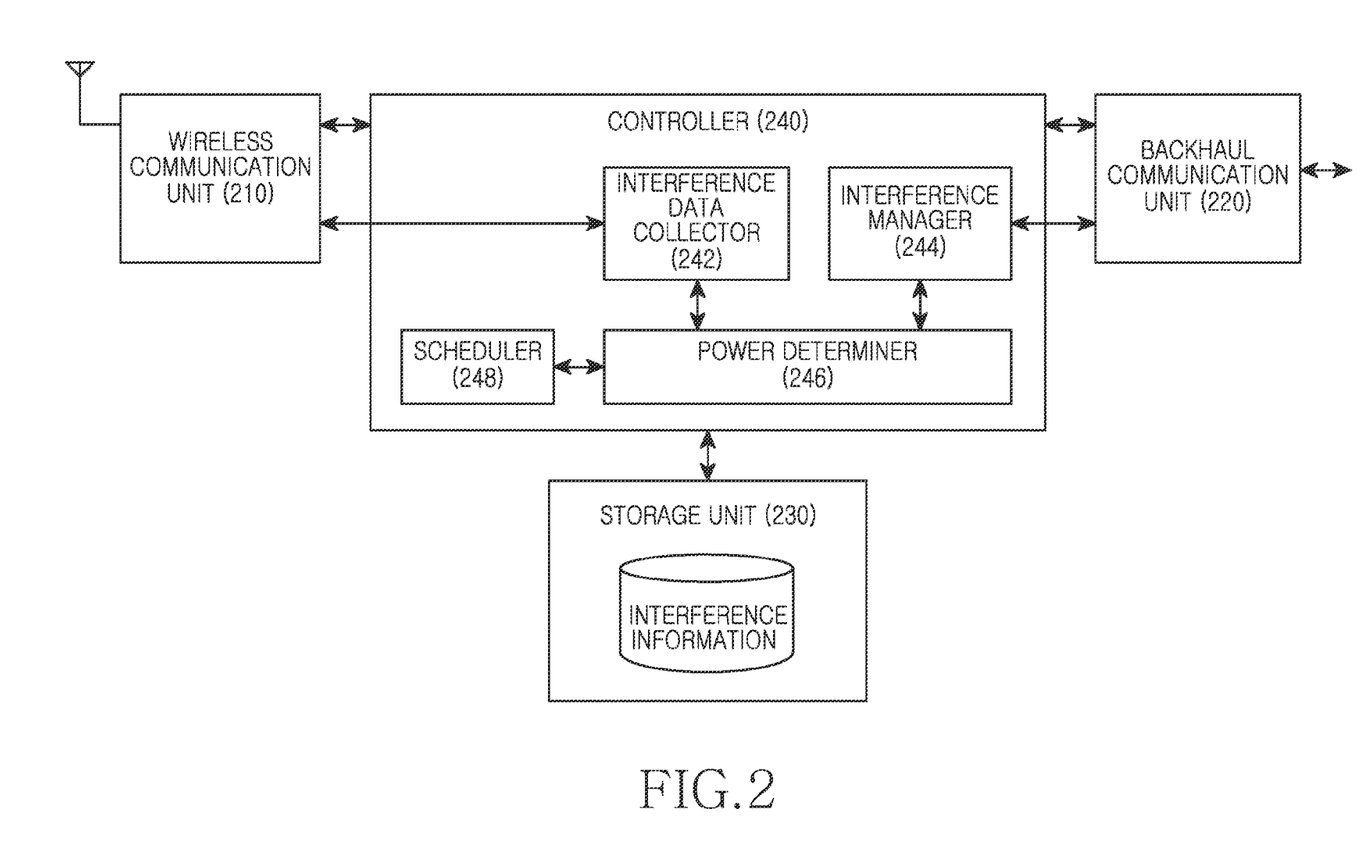
FIG. 2 is a block diagram illustrating a construction of a serving BS in a wireless communication system according to an exemplary embodiment of the present invention.

FIG. 2 is a block diagram illustrating a construction of a serving BS in a wireless communication system according to an exemplary embodiment of the present invention.

Referring to FIG. 2, the serving BS includes a wireless communication unit 210, a backhaul communication unit 220, a storage unit 230, and a controller 240.

The wireless communication unit 210 provides an interface for performing communication through a wireless channel with MSs located within a cell. For example, the wireless communication unit 210 performs a function for transmitting/receiving a signal through the wireless channel, such as modulation, demodulation, signal band conversion, amplification, and the like. The wireless communication unit 210 may include a modulator, a demodulator, an amplifier, a mixer, an oscillator, a Digital to Analog Converter (DAC), an Analog to Digital Converter (ADC), and the like.

The backhaul communication unit 220 provides an interface for the serving BS to perform communication with other nodes (e.g., neighboring BSs) within a network. For example, the backhaul communication unit 220 converts a bit stream transmitted by the serving BS into a physical signal, and converts a physical signal received by the serving BS into a bit stream.

The storage unit 230 stores data of a basic program for an operation of the serving BS, an application program, setting information, and the like. Particularly, the storage unit 230 stores received signal strength indication information collected from at least one MS located within a cell, interference information received from at least one neighboring BS, interference information generated by the serving BS, and the like. The storage unit 230 provides the stored data in response to a request of the controller 240.

The controller 240 controls general operations of the serving BS. For example, the controller 240 provides transmission data to the wireless communication unit 210, and processes traffic and signaling data provided from the wireless communication unit 210. Particularly, according to an exemplary embodiment of the present invention, the controller 240 performs downlink power control for interference mitigation. For the sake of the power control, the controller 240 includes an interference data collector 242, an interference manager 244, a power determiner 246, and a scheduler 248. The interference data collector 242 collects received signal strength indication information from at least one MS. The interference manager 244 performs information exchange with at least one neighboring BS. The power determiner 246 determines burst transmission power by MS, by using information provided from the at least one neighboring BS and a channel state of a serving MS. The scheduler 248 allocates a burst according to the determination of the power determiner 246 and applies transmission power. For instance, the interference data collector 242, the interference manager 244, the power determiner 246, and the scheduler 248 perform the procedure of FIG. 1. Operation of the controller 240 for the power control is described below in detail.

The controller 240 collects received signal strength indication information measured by at least one MS through the wireless communication unit 210. The received signal strength indication information includes a received signal strength indication for at least one neighboring BS as well as a received signal strength indication for the serving BS measured by an MS. The controller 240 determines interference information having reflected a resource usage rate of the serving BS, by using a received signal strength indication experienced by at least one MS, a channel quality experienced by the MS, a resource usage rate within a cell, and the like. In detail, the controller 240 calculates a channel quality of at least one MS by using the received signal strength indication information, and determines at least one MPR from at least one channel quality. At this time, the controller 240 determines an MPR of when each neighboring BS changes downlink power, and an MPR of when itself changes downlink power. The controller 240 calculates a throughput sensitivity of when each neighboring BS changes the downlink power by using the determined at least one MPR, and reflects the resource usage rate in the throughput sensitivity to compensate the throughput sensitivity.

After determining the interference information having reflected the resource usage rate of the serving BS, the controller 240 exchanges the interference information with at least one neighboring BS through the backhaul communication unit 220. After exchanging the interference information with the at least one neighboring BS, the controller 240 calculates a throughput variance amount by MS for at least one MS located within a cell. The throughput variance amount may be determined in various ways such as the way of maximizing a transfer rate, the way of maximizing a PF metric, and the like. For example, the controller 240 may calculate the throughput gain, by dividing by a current MPR an MPR of when the serving BS changes downlink power. At this time, a weight may be granted to the MPR of when the serving BS changes the downlink power. Next, the controller 240 controls power for each MS according to the throughput variance amount. For example, regarding each MS, the controller 240 compares the throughput variance amount with a throughput variance amount exerted to a neighboring BS when the serving BS changes the downlink power for the sake of the throughput gain. If the comparison result is that a throughput variance amount of a specific MS is greater than the throughput variance amount exerted to the neighboring BS, the controller 240 increases downlink power for the specific MS. In contrast, if the throughput variance amount exerted to the neighboring BS is greater than the throughput variance amount of the specific MS, the controller 240 decreases the downlink power for the specific MS. According to another exemplary embodiment of the present invention, if the throughput variance amount exerted to the neighboring BS is greater than the throughput variance amount of the specific MS, the controller 240 may maintain the downlink power for the specific MS. According to a further exemplary embodiment of the present invention, if the throughput variance amount of the specific MS and the throughput variance amount exerted to the neighboring BS are the same as each other, the controller 240 may maintain the downlink power for the specific MS. According to a yet another exemplary embodiment of the present invention, if a difference between the throughput variance amount of the specific MS and the throughput variance amount exerted to the neighboring BS is equal to or less than a threshold, the controller 240 may maintain the downlink power for the specific MS.

Figure 3:
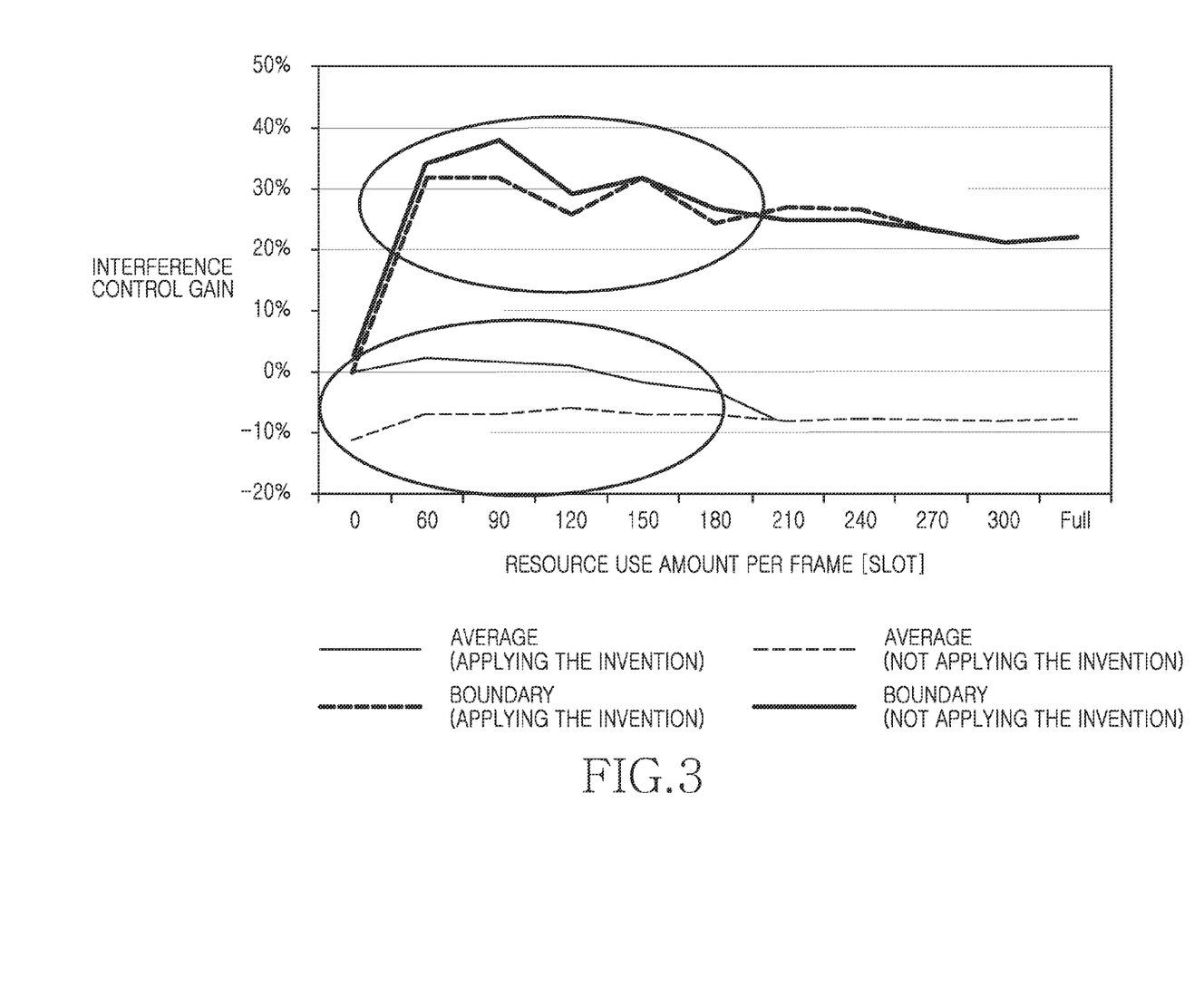
FIG. 3 is a graph illustrating a comparison of performance between an exemplary embodiment of the present invention and the related art.

FIG. 3 illustrates a comparison of performance between a wireless communication system according to an exemplary embodiment of the present invention and a wireless communication system according to the related art.

Referring to FIG. 3, a vertical axis denotes a resource use amount per frame and expresses the resource use amount in a slot unit, and a horizontal axis denotes an interference control gain and represents a rate of a gain of interference control compared to no interference control.

Referring to FIG. 3, in a duration in which a resource usage rate is high, an exemplary embodiment of the present invention exhibits similar performance compared to the related art. However, in a duration in which the resource usage rate is low, an exemplary embodiment the present invention exhibits improved performance compared to the related art. Particularly, in a cell boundary area, the exemplary embodiment of the present invention exhibits a remarkably high extent of performance improvement. For example, exemplary embodiments of the present invention has an effect in which, upon determining interference amount information, an interference amount notified to a neighboring BS is controlled according to an actual resource usage rate of a serving BS, thereby preventing the unnecessary downlink power decrease phenomenon of a neighboring BS. Consequently, the deterioration of a downlink throughput of the neighboring BS is prevented.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

According to exemplary embodiments of the present invention, unnecessary power transmission is efficiently minimized and system performance is improved, by determining optimal transmission power adaptively to the distribution of serving MSs and interfering MSs in terms of the whole system throughput between reception power (i.e., an interference amount for the serving MS and reception power for the interfering MS in a wireless communication system).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a serving Base Station (BS) in a wireless communication system, the method comprising:
   receiving interference information comprising a resource usage rate, from at least one neighboring BS;
   calculating a throughput variance amount, which is expected if the serving BS changes power, experienced by the at least one neighboring BS, by using the interference information;
   calculating a throughput variance amount, which is expected if the serving BS changes power, of at least one Mobile Station (MS) having access to the serving BS; and
   controlling power for the at least one MS by using the throughput variance amount experienced by the at least one neighboring BS and the throughput variance amount of the at least one MS,
   wherein the interference information represents a throughput variance amount generated in the at least one neighboring BS when the serving BS changes the power.

2. The method of claim 1, further comprising:
   calculating a throughput variance amount, which is expected if at least one neighboring BS changes power, generated in the serving BS;
   compensating the throughput variance amount according to a resource usage rate of the serving BS; and
   transmitting the throughput variance amount compensated according to the resource usage rate of the serving BS, to the at least one neighboring BS.

3. The method of claim 2, further comprising calculating the resource usage rate by using an available resource amount and a used resource amount.

4. The method of claim 2, wherein the calculating of the throughput variance amount generated in the serving BS comprises:

by using a channel quality of the at least one MS, determining a current Modulation order Product code Rate (MPR) of the at least one MS, determining an MPR of when the at least one neighboring BS changes the power, and determining an MPR of when the serving BS changes the power; and by using the determined MPRs, calculating a throughput variance amount when each of the at least one neighboring BS changes downlink power.

5. The method of claim 4, wherein the calculating of the throughput variance amount comprises calculating a channel quality value of the at least one MS by using received signal strength indication information received from the at least one MS.

6. The method of claim 1, wherein the interference information received from the at least one neighboring BS comprises a value compensating the throughput variance amount, which is generated in the at least one neighboring BS when the serving BS changes power, according to a resource usage rate of the at least one neighboring BS.

7. The method of claim 1, wherein the calculating of the throughput variance amount experienced by the at least one neighboring BS comprises summing up the throughput variance amount comprised in the interference information received from the at least one neighboring BS.

8. The method of claim 1, wherein the calculating of the throughput variance amount of the at least one MS having access to the serving BS comprises dividing an MPR of when the serving BS changes the power by a current MPR.

9. The method of claim 1, wherein the controlling of the power for the at least one MS by using the throughput variance amount experienced by the at least one neighboring BS and the throughput variance amount of the at least one MS comprises increasing downlink power for the at least one MS if the throughput variance amount of the at least one MS is greater than the throughput variance amount experienced by the at least one neighboring BS.

10. The method of claim 1, wherein, when the serving BS increases the power, the throughput variance amount experienced by the at least one neighboring BS is a throughput loss amount and the throughput variance amount of the MS is a throughput gain amount, and when the serving BS decreases the power, the throughput variance amount experienced by the neighboring BS is a throughput gain amount, and the throughput variance amount of the MS is a throughput loss amount.

11. An apparatus of a serving Base Station (BS) in a wireless communication system, the apparatus comprising:
a backhaul communication unit configured to receive interference information comprising a resource usage rate, from at least one neighboring BS; and
a controller configured to, calculate a throughput variance amount, which is expected if the serving BS changes power, experienced by the at least one neighboring BS, by using the interference information, for calculate a throughput variance amount, which is expected if the serving BS changes power, of at least one Mobile Station (MS) having access to the serving BS, and control power for the at least one MS by using the throughput variance amount experienced by the at least one neighboring BS and the throughput variance amount of the at least one MS, wherein the interference information represents a throughput variance amount generated in the at least one neighboring BS when the serving BS changes the power.

12. The apparatus of claim 11, wherein the controller calculates a throughput variance amount, which is expected if the at least one neighboring BS changes power, generated in the serving BS, and compensates the throughput variance amount according to a resource usage rate of the serving BS, and the backhaul communication unit transmits the throughput variance amount compensated according to the resource usage rate of the serving BS, to the at least one neighboring BS.

13. The apparatus of claim 12, wherein the controller calculates the resource usage rate by using an available resource amount and a used resource amount.

14. The apparatus of claim 12, wherein the controller determines a current Modulation order Product code Rate (MPR) of the at least one MS, determines an MPR of when the at least one neighboring BS changes the power, determines an MPR of when the serving BS changes the power, by using a channel quality of the at least one MS, and calculates a throughput variance amount of when each of the at least one neighboring BS changes downlink power, by using the determined MPRs.

15. The apparatus of claim 14, wherein the controller calculates a channel quality value of the at least one MS by using received signal strength indication information received from the at least one MS.

16. The apparatus of claim 11, wherein the interference information received from the at least one neighboring BS comprises a value compensating the throughput variance amount, which is generated in the at least one neighboring BS when the serving BS changes power, according to a resource usage rate of the at least one neighboring BS.

17. The apparatus of claim 11, wherein, to calculate the throughput variance amount experienced by the at least one neighboring BS, the controller sums up the throughput variance amount comprised in the interference information received from the at least one neighboring BS.

18. The apparatus of claim 11, wherein, to calculate the throughput variance amount of the at least one MS having access to the serving BS, the controller divides an MPR of when the serving BS changes the power by the current MPR.

19. The apparatus of claim 11, wherein the controller increases downlink power for the at least one MS if the throughput variance amount of the at least one MS is greater than the throughput variance amount experienced by the at least one neighboring BS.

20. The apparatus of claim 11, wherein, when the serving BS increases the power, the throughput variance amount experienced by the at least one neighboring BS is a throughput loss amount and the throughput variance amount of the at least one MS is a throughput gain amount, and when the serving BS decreases the power, the throughput variance amount experienced by the neighboring BS is a throughput gain amount, and the throughput variance amount of the MS is a throughput loss amount.

* * * * *